Figure 1:
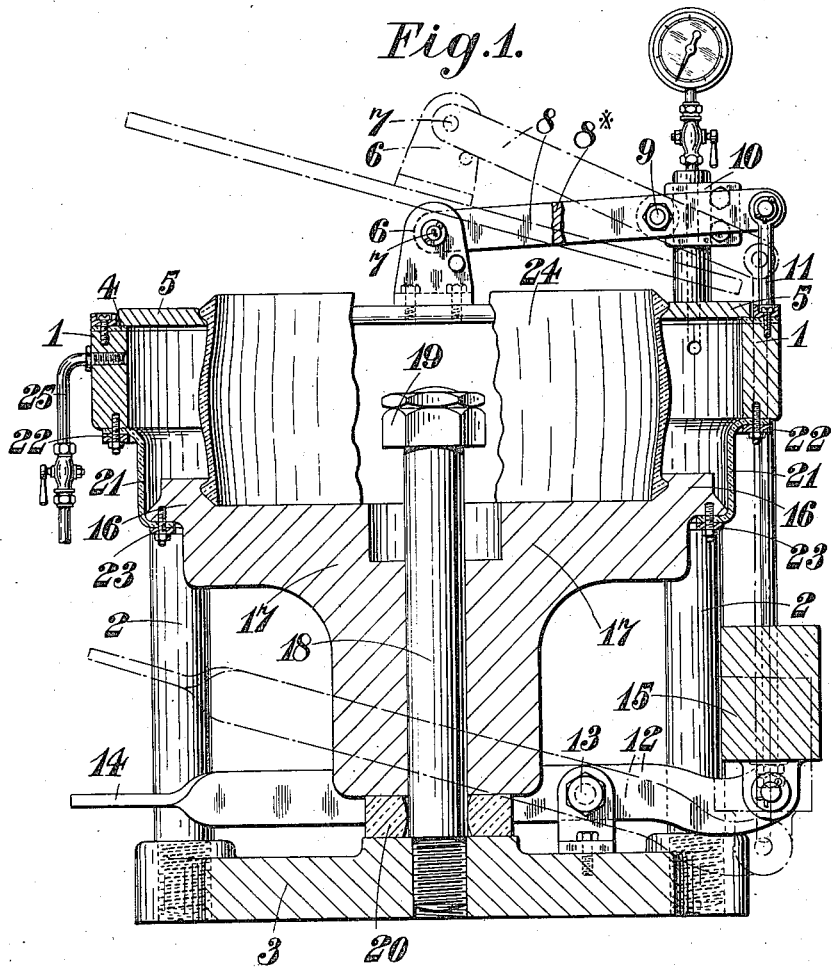

March 18, 1924.

T. SLOPER

APPLIANCE FOR THE MANUFACTURE OF PNEUMATIC TIRES

Filed June 17, 1921  2 Sheets-Sheet 1

Patented Mar. 18, 1924.

1,487,034

UNITED STATES PATENT OFFICE.

THOMAS SLOPER, OF DEVIZES, ENGLAND.

APPLIANCE FOR THE MANUFACTURE OF PNEUMATIC TIRES.

Application filed June 17, 1921. Serial No. 478,320.

*To all whom it may concern:*

Be it known that I, THOMAS SLOPER, a subject of the King of England, residing in Devizes, Wiltshire, England, have invented certain new and useful Improvements in Appliances for the Manufacture of Pneumatic Tires, of which the following is a specification.

This invention is for improvements in or relating to appliances for the manufacture of pneumatic tires and has for its object to provide a modified form of the apparatus for shaping tire-covers described in my prior patent specification Serial No. 358,216.

The tire-covers to be shaped by this apparatus are manufactured in the form of flat endless bands, and the apparatus described in my previous patent specification comprises two flat plates which are placed face to face and have lips on their opposed faces to engage the beads of the flat tire band. The band, when placed between the plates, forms with them a closed chamber, and means is provided for moving the plates together so that the air between them is compressed and the central portion of the band is thrust outwards whereby the required shaping is effected.

It is pointed out in the aforesaid prior specification that the conditions may be reversed, that is, instead of applying superatmospheric pressure to the interior of the tire-band, a vacuum could be created on the exterior of the same so that atmospheric pressure would effect the requisite shaping, and the present invention relates to a specific form of apparatus for this purpose which is of the same type as that previously described in that the flat tire-band is held between opposed plates which constitute with the band parts of a fluid-tight chamber, one or both of the plates being movable at will to bring them nearer to, or further from each other, and means being provided whereby fluid-pressure can operate upon the inner face of the tire-band to shape it between the plates as these are brought together.

According to the present invention, tire-shaping apparatus of the type described comprises means to form a fluid-tight chamber on the outside of the tire-band by annular plates which engage the beads of the tire-band, are disposed approximately parallel to each other and have external sealing means between them which is such as to allow relative movement towards or away from each other, (for example by the bodily movement of one plate, the other remaining stationary), and means for exhausting fluid from the said chamber to cause atmospheric pressure on the inner face of the tire-band to force the centre of the band outwards when said band is in position in the apparatus.

In the accompanying drawings which illustrate one method of carrying out this invention—

Figure 2:
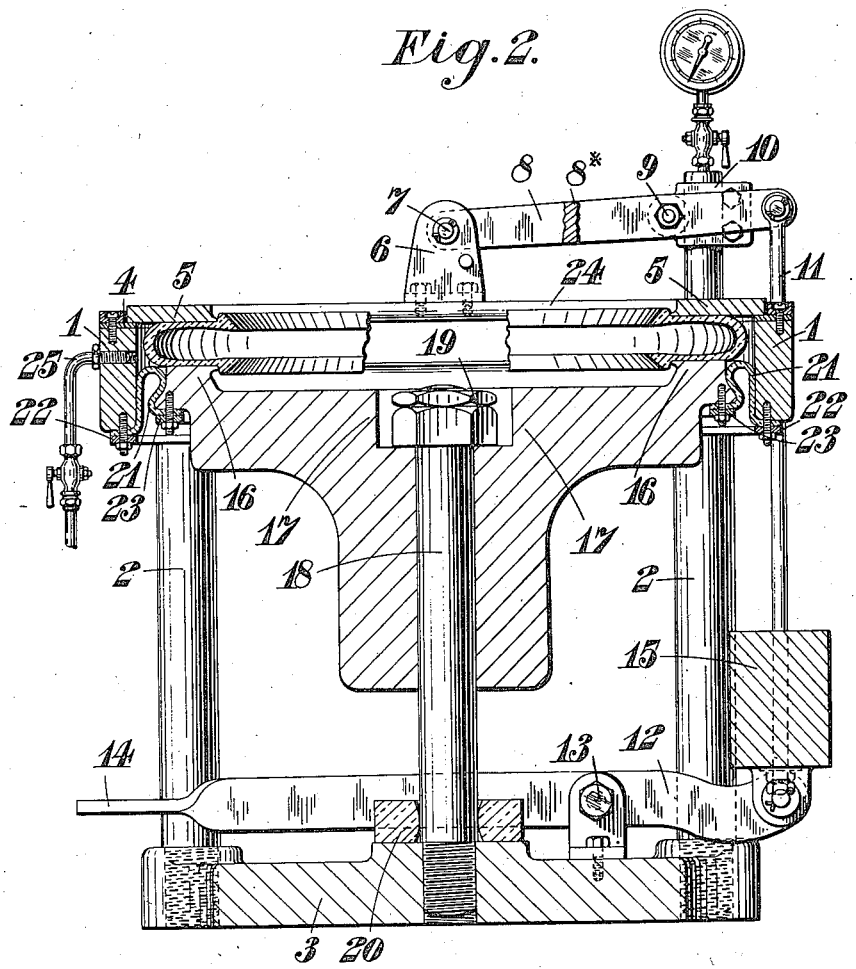

Figure 1 is a central vertical section through the apparatus with the parts in position ready for operation, and Figure 2 is a central vertical section through the apparatus showing the position the parts assume at the close of operations.

The apparatus comprises a fixed annular frame-member 1 which is carried on supports 2 projecting from a base-plate 3. This annular frame-member has a rubber seating 4 to receive an annular plate 5 constituting one of the two plates between which the tire-band is shaped. This plate merely rests on the seating 4 and has a pair of upstanding lugs 6 which are pivoted at 7 to the ends of a forked arm 8. (As the drawings show the apparatus in central vertical section only one lug 6 and the corresponding limb of the forked member 8 is shown, the other limb being indicated as broken away at 8.) The arm 8 is pivoted at 9 to a fixed member 10, and from that end which lies on the other side of the pivot to that occupied by the previously mentioned forked end depends a rod 11 which pivotally connects the arm to an operating lever 12. This lever is pivoted at 13 and has a foot-pedal 14. Weights 15 are placed round the rod 11 to counterbalance the arm 8 and the plate 5.

The co-operating annular plate for shaping the tire-cover is constituted by an upwardly projecting flange 16 on a sliding member 17. This member 17 is made bulky to give it increased weight and slides upon a central guide-rod 18 screwed into the base-plate 3. Nuts 19 on top of the guide-rod limit the amount of upward travel for the member 17 and a rubber cushion 20 placed round the bottom of the guide-rod 18 limits the degree of downward movement and affords a buffer for the member.

To provide external sealing means between the plates 5 and 16 and yet permit relative movement nearer to or further from each other, a flexible connecting-wall 21 is provided. This may be of rubber material reinforced with canvas to prevent its stretching, and has one edge clamped to the annular frame-member 1 by a ring 22 secured by bolts and nuts, and the other edge clamped to the member 17 by a ring 23 secured by bolts and nuts.

The operation of this apparatus is as follows:—

The tire-band, indicated at 24, is placed, whilst in its flat form, in the position shown in Figure 1, with the beaded edges engaging suitably shaped lips provided on the interior edges of the annular plates 5 and 16. It will be observed that owing to the annular plate 5 having its central portion entirely open, the tire-band can easily be got into this position. The chamber formed by the plates 5 and 16 with their attached portions 1 and 17, is then exhausted by apparatus connected to a conduit 25 which communicates with the interior of the chamber and as this chamber is formed on the outside of the tire-band exhaustion of the air therefrom will cause the air on the inner face of the tire-band, which air is at atmospheric pressure, to force the central portion of the band outwards. To prevent the plate 16 from approaching the plate 5 before a proper joint is made between the tire-band and the plates, the plate 16 is made heavy, and consequently as the air is exhausted from the chamber the downward pull of the plate causes the desired intimate contact between the tire-band and the plates prior to the lifting of the plate.

When the plate 16 has assumed the position shown in Figure 2 the shaping is completed and a retaining ring of any convenient construction can then be introduced into the shaped interior of the tire-band. This ring may be made of two or more sections hinged together, or otherwise, and can be readily introduced through the opening afforded by the clear central space of the annular plate 5, but such ring constitutes no part of the present invention and need not, therefore, be described in detail.

As soon as the retaining ring is in place air is admitted to the sealed chamber outside the tire-band whereupon the plate 16 releases itself from the tire-band and drops, or if desired, locking means not shown in the drawings may be provided to temporarily hold it in the raised position. After admission of air to the sealed chamber the counter-balanced plate 5 is swung up from its seating and the tire-band can then be removed, with the retaining ring in it, ready for introduction into the vulcanizer or for such further treatment as may be required before vulcanizing. The apparatus is then ready to receive another tire-band. The object of the pedal 14 is to enable the plate 5 to be pressed home upon its seating 4, prior to exhausting the air from the chamber so as to ensure that it shall effect a proper seal with the annular frame-member 1.

It will be appreciated that the term "annular plates" used throughout this specification and claims is intended to cover any member which provide the requisite opposed annular surfaces, bear against the sides of the same as this is shaped, and have lips to receive the beads of the tire-cover.

Obviously, various modifications may be made without departure from this invention, for example, the rubber or other sealing means for the joint between the plate 5 and the annular frame-member 1 may be secured to the plate instead of the member 1, as all that is necessary is to provide a fluid-tight seating which is operative between these two parts whether the sealing means is carried on one part or on both. Obviously, both plates may be made movable if desired and the central guide-rod 18 is not essential, for instance the plates could slide in a member equivalent to the frame-member 1 making a fluid-tight joint therewith, or one plate could be fixed to it and the other could slide in the same, the said plate or plates being guided by any suitable means other than the central rod 18.

Obviously, the plate 16, instead of being made heavy itself, may have weights placed upon the portion 17 within the tire-band, or for exceptionally heavy tires it may be necessary to add such weights even when the plate 16 is made heavy.

What I claim as my invention and desire to secure by Letters Patent is:—

1. Tire-shaping apparatus comprising in combination opposed members whereof one is movable towards and away from the other provided with annular lips for engaging the exterior edges of a "flat" tire-band and so constructed as to provide a fluid-tight chamber between them exterior to the tire-band whereof one wall is formed by the tire-band and the opposed wall has a relatively collapsible part, and means for exhausting the air from the chamber thus formed.

2. Tire-shaping apparatus comprising in combination, a member provided with an annular lip for engaging one of the exterior edges of a "flat" tire-band in such manner as to afford free access to the interior of the tire-band, an opposed member provided with an annular lip for engaging the other exterior edge of a "flat" tire-band, one of these members being movable towards and away from the other and both being so constructed as to provide a fluid-tight chamber between them exterior to the tire-band whereof one wall is formed by the tire-band and the opposed wall has a relatively collapsible part, and means for exhausting the air from the chamber thus formed.

3. Tire-shaping apparatus comprising in combination, opposed members whereof one is movable towards and away from the other provided with annular lips for engaging the exterior edges of a "flat" tire-band and so constructed as to provide a fluid-tight chamber between the exterior to the tire-band whereof one wall is formed by the tire-band and the opposed wall has a flexible portion permitting movement of one member towards the other whilst maintaining fluid-tight connection with the adjoining parts, and means for exhausting the air from the chamber thus formed.

4. Tire-shaping apparatus comprising in combination opposed members whereof one is movable towards and away from the other provided with annular lips for engaging the exterior edges of a "flat" tire band and so constructed as to provide a fluid-tight chamber between them exterior to the tire-band whereof one wall is formed by the tire-band and the opposed wall has a relatively collapsible part, means for exhausting the air from the chamber thus formed, and means for holding one of the opposed members against movement towards the other prior to establishing a given fluid-pressure on the interior of the tire-band relatively to the pressure exterior to the same.

5. Tire-shaping apparatus comprising in combination opposed upper and lower members whereof the lower member is movable towards and away from the upper and is loaded, the opposed faces of the members being provided with annular lips for engaging the exterior edges of a "flat" tire-band and so constructed as to provide a fluid-tight chamber between them exterior to the tire-band whereof one wall is formed by the tire-band and the opposed wall has a relatively collapsible part, and means for exhausting the air from the chamber thus formed until sufficient fluid-pressure is established on the interior of the tire-band to overcome the loading of the lower member and this is raised as the centre of the tire-band is driven outwards.

6. Tire-shaping apparatus comprising in combination, opposed upper and lower members whereof the lower member is movable towards and away from the upper and is loaded, the opposed faces of the members being provided with annular lips for engaging the exterior edges of a "flat" tire-band and so constructed as to provide a fluid-tight chamber between them exterior to the tire-band whereof one wall is formed by the tire-band and the opposed wall has a relatively collapsible part, means for exhausting the air from the chamber thus formed until sufficient fluid-pressure is established on the interior of the tire-band to overcome the loading of the lower member and this is raised as the centre of the tire-band is driven outwards, and a central vertical guide-rod for the movable member.

7. Tire-shaping apparatus comprising in combination, a base, an annular frame member supported from the base disposed parallel thereto and having an inwardly-directed lip to engage one exterior edge of a "flat" tire-band, an opposed disk-like member situated below the engaging lip of the annular member and having an annular lip for engaging the other exterior edge of a "flat" tire-band, a flexible annular wall connecting the aforesaid annular member to the disc-like member exterior to the aforesaid lip of the disc-like member which wall effects an hermetical seal with the two parts it connects, and means for exhausting air from the chamber formed by the annular member, disc-like member, the flexible connection and the tire-band when this is in place, to cause the lower member to rise under atmospheric pressure as the centre of the tire-band expands.

8. Tire-shaping apparatus comprising an combination, a base, an annular frame member supported from the base and disposed parallel thereto, an annular plate so bedded on the top of the annular member as to effect an hermetical seal therewith and projecting inwards to provide a lip thereto for engaging one exterior edge of the tire-band, readily detachable means for holding this plate in position on the annular member, an opposed disc-like member situated below the engaging lip of the annular member and having an annular lip for engaging the other exterior edge of a "flat" tire-band, a flexible annular wall connecting the aforesaid annular member to the disc-like member exterior to the aforesaid lip on the disc-like member, which wall effects an hermetical seal with the two parts it connects, means for exhausting air from the chamber formed by the annular member, annular plate, disc-like member, the flexible connection and the tire-band when this is in place, to cause the lower member to rise under atmospheric pressure as the centre of the tire-band expands.

9. Tire-shaping apparatus comprising in combination, a base, an annular frame member supported from the base and disposed parallel thereto, an annular plate so bedded on the top of the annular member as to effect an hermetical seal therewith and projecting inwards to provide a lip thereto for engaging one exterior edge of the tire-band, means for readily lifting this plate away from the annular member and returning it thereto, an opposed disc-like member situated below the engaging lip of the annular member and having an annular lip for engaging the other exterior edge of a flat tire-band, and a flexible wall connecting the lower side of the aforesaid annular member to the disc-like member exterior to the aforesaid lip on the disc-like member, which wall effects an hermetical seal with the two parts it connects, and means for exhausting air from the chamber formed by the annular member, annular plate, disc-like member, the flexible connection and the tire-band when this is in place, to cause the lower member to rise under atmospheric pressure as the centre of the tire-band expands.

10. Tire-shaping apparatus comprising in combination, a base, an annular frame member supported from the base and disposed parallel thereto, an annular plate so bedded on the top of the annular member as to effect an hermetical seal therewith and projecting inwards to provide a lip thereto for engaging one exterior edge of the tire-band, an arm pivoted to the frame extending over this annular plate and having pivotal engagement therewith so that by swinging the arm the plate can be raised from the annular member or brought down upon the same, an opposed disc-like member situated below the engaging lip of the annular member and having an annular lip for engaging the other exterior edge of a flat tire-band, and a flexible wall connecting the lower side of the aforesaid annular member to the disc-like member exterior to the aforesaid lip on the disc-like member, which wall effects an hermetical seal with the two parts it connects, and means for exhausting air from the chamber formed by the annular member, annular plate, disc-like member, the flexible connection and the tire-band when this is in place, to cause the lower member to rise under atmospheric pressure as the centre of the tire-band expands.

11. Tire-shaping apparatus comprising in combination, a base, an annular frame member supported from the base and disposed parallel thereto, an annular plate so bedded on the top of the annular member as to enable it to effect an hermetical seal therewith and projecting inwards to provide a lip thereto for engaging one exterior edge of the tire-band, an opposed disc-like member situated below the engaging lip of the annular member and having an annular lip for engaging the other exterior edge of a flat tire-band, a flexible wall connecting the lower side of the aforesaid annular member to the disc-like member exterior to the aforesaid lip on the disc-like member, which wall effects an hermetical seal with the two parts it connects, means for exhausting air from the chamber formed by the annular member, annular plate, disc-like member, the flexible connection and the tire-band when this is in place, to cause the lower member to rise under atmospheric pressure as the centre of the tire-band expands, a lever pivoted to the frame extending over the annular plate and having pivotal engagement therewith so that by swinging the arm the plate can be raised from the annular member or brought down upon the same, and means for applying thrust to the lever of the annular plate in such direction as to force its operative end downwards for the purpose of firmly bedding the annular plate upon the annular member when required.

In testimony whereof I affix my signature.

THOMAS SLOPER.